United States Patent

[11] 3,634,054

| [72] | Inventor | Joseph P. Stalego<br>Newark, Ohio |
|---|---|---|
| [21] | Appl. No. | 62,685 |
| [22] | Filed | Aug. 10, 1970 |
| [45] | Patented | Jan. 11, 1972 |
| [73] | Assignee | Owens-Corning Fiberglas Corporation<br>Continuation of application Ser. No.<br>698,713, Jan. 18, 1968, now abandoned.<br>This application Aug. 10, 1970, Ser. No.<br>62,685 |

[54] FILAMENTIZING PROCESS FOR GLASS FIBERS
8 Claims, No Drawings

[52] U.S. Cl.................................................... 65/3,
19/66 T, 28/76, 65/4, 117/126 GQ, 117/126 GN,
260/613 R, 260/632 Y
[51] Int. Cl..................................................... C03c 25/02
[50] Field of Search........................................... 260/613 R,
632 Y; 117/126 GQ, 126 GN; 65/3, 4; 28/15 M,
76; 19/66 T

[56] References Cited
UNITED STATES PATENTS

| 2,919,970 | 1/1960 | Russell.......................... | 65/3 |
| 3,060,501 | 10/1962 | Beal............................. | 18/8 |
| 3,391,052 | 7/1968 | Marzocchi..................... | 65/3 UX |

OTHER REFERENCES

Chemical Abstracts: Vol. 67, 1967, page 11,188, number 118,464r.

*Primary Examiner*—S. Leon Bashore
*Assistant Examiner*—Robert L. Lindsay, Jr.
*Attorney*—Staelin & Overman

ABSTRACT: A process of making glass fiber mats using a composition which is substantially fugitive in nature for use in the treatment of glass fibers to provide easier filamentization of fiber strands, and which is especially adapted for use on glass fibers which are to be used in the production of glass fiber mats when maximum water-repellent properties are desired. In a preferred embodiment the composition consists of 3,5-dimethyl-1-hexyn-3-ol plus a minor amount of iso-octyl-phenoxy-polyoxyethylene ethanol.

FILAMENTIZING PROCESS FOR GLASS FIBERS

This application is a continuation of serial number 698,713, filed Jan. 18, 1968, now abandoned.

In general most glass fiber mat products are made by impregnating a mat of either continuous or discontinuous glass fibers with a binder composition containing a synthetic thermosetting resin and other additives and then heating the mat to cure the resin. In some instances the glass fibers are in the form of continuous strands which in forming the mat are laid down in substantially sinusoidal waveform. This provides improved tensile strength to the mat, as compared to mats made of randomly oriented discontinuous fibers. Such additional strength permits their use in many installations in which they could not otherwise be used, such as roofing mats.

In the manufacture of roofing mats from strands of glass fibers, such as the method where strands of fibers are formed from attenuated glass streams pulled over rollers or wheels which draw the streams of fine fibers or filaments together to form the strands, it is important that the strands be later filamentized (separated) to provide the necessary small interstices between individual fibers into which a subsequently applied resinous binder or reinforcing material such as asphalt can penetrate. Filamentization is important so that uniform distribution of the resin or other additive material throughout the mat can be achieved, thereby preventing channels for water flow from developing at areas of weakness not covered by the resin.

Several methods of filamentizing the strands have been suggested, e.g., by impingement upon the strands of high velocity streams of fluid such as water, or gaseous fluids, to overcome forces holding the filaments together in the strand.

The present invention is concerned with an improvement of this method, which involves pretreating the glass fiber strands with a composition which acts to reduce the surface tension of the impinging water enabling it to penetrate further into the interstices of the glass fiber strand, thus aiding the filamentization process above described. This allows better fiber distribution and easier penetration or better "wet out" of the subsequently applied resin or other material into the interstices. Inasmuch as a sizing agent has to be applied to continuous fibers to prevent them from abrading one another during the mat manufacturing operation (and thereby causing a loss in tensile strength), the ideal composition would serve as a size, and also serve to reduce the surface tension of the impinging water on the fibers thereby aiding filamentization. Such an ideal composition would be surface active in nature and at least partially hydrophilic.

It is desired that roofing mats be water-repellent, or at least nonhydrophilic in nature. It can thus be appreciated that a composition which aids in filamentization by reducing the surface tension of water is undesirable from the standpoint of water repellency since compositions which reduce surface tension are at least partially hydrophilic in nature, and thus would attract water instead of repelling it.

This invention, therefore, is concerned with a sizing and filamentizing aid composition which, while partially hydrophilic in nature, nevertheless does not interfere with the water-repellent characteristics of the mat after it has been cured.

It is an object of this invention to provide a sizing and filamentizing aid composition for application to glass fibers.

It is a further object of this invention to provide a fugitive sizing and filamentizing aid composition which when applied to glass fibers acts to reduce the surface tension of water subsequently applied thereto, but because of its fugitive nature does not substantially affect the water-repellent properties of the cured glass fiber mat.

It is a further object of this invention to provide a process for producing glass fiber mats wherein the fibers are treated with the compositions of this invention.

In accordance with this invention a composition is provided which has the dual function of sizing and aiding filamentization of fibers. The composition consists essentially of an aqueous solution of: 3,5-dimethyl-1-hexyn-3-ol and a minor proportion of iso-octyl-phenoxy-polyoxyethylene ethanol.

The above-stated composition is, as can be recognized by those skilled in the art, a combination of two wetting and dispersion agents. The composition is substantially fugitive, i.e. on heating slightly, the major component (3,5-dimethyl-1-hexyn-3-ol) evaporates leaving no residue. When this composition is applied to glass fibers and glass fiber strands, it serves to decrease the surface tension of subsequently applied impinging water, allowing the strands to be more easily filamentized by the impinging water and allowing the later applied resin or other additive better to penetrate into the interstices of the strand and saturate or "wet out" completely the glass fibers.

As has been heretofore mentioned, after the resin binder is applied to the glass fiber mat, the resin is normally cured by heating the mat in an oven. During this step, the sizing and filamentizing aid composition (hereinafter for purposes of simplicity referred to as filamentizing composition) present on the fibers volatilizes, leaving the product essentially unaffected as far as its water-repellent properties are concerned. That is, if no special water-repellent material was applied to the mat, a mat made with fibers treated with the filamentizing composition of this invention would exhibit essentially the same water-repellency or moisture resistance as a mat made with nontreated fibers. In other words, the filamentizing composition has essentially no effect on the water-repellent properties of the cured glass fiber mat.

The 3,5-dimethyl-1-hexyn-3-ol component of the composition of this invention is preferably present in proportion ranging from about 85 to about 98.5 percent by weight with 98 percent being the most preferred. A particularly suitable 3,5-dimethyl-1-hexyn-3-ol is one sold under the trade name Surfynol 61 by the Air Reduction Chemical & Carbide Company, New York, New York.

The iso-octyl-phenoxy-polyoxyethylene ethanol wetting agent, the minor component of the composition of this invention, is present in minor proportions, i.e. in proportions ranging from about 1.5 to about 15 percent by weight, with 2 percent being the most preferred. A particularly suitable iso-octyl-phenoxy-polyoxyethylene ethanol wetting agent is obtained under the trade name Igepal CA-630 and is sold by the Antara Div. of the General Aniline and Film Company, New York, New York.

The 3,5-dimethyl-1-hexyn-3-ol component of the composition is the principal filamentizing aid, while the iso-octyl-phenoxy-polyoxyethylene ethanol compound is used in order to obtain better wetting of the roll applicator (described hereinafter) and fibers with the particular formulation disclosed herein. Desirably, the iso-octyl-phenoxy-polyoxyethylene ethanol is used in as small a proportion as possible, but enough must be used to provide adequate wetting of the roll applicator.

Sufficient water must be added to cause the 3,5-dimethyl-1-hexyn-3-ol to go into solution. This amount will vary depending on the proportion of the compound in the composition.

As much as 1 liter of water per gram of compound to as little as the solubility limit can be used. It is Preferred, however, to add from about 130 ml. to about 315 ml. of water per gram of the compound.

The filamentizing compositions of this invention are preferably applied to individual glass fibers by means of a roll applicator as the fibers are attenuated from the bushings. This enables the composition to be distributed equally all over the individual fibers. Suitable apparatus for accomplishing this application is known. It is not essential, however, that the composition be applied in that manner. Any method is suitable so long as substantially uniform distribution of the composition on the fiber is obtained.

The following example is illustrative of the practice of this invention.

EXAMPLE I

A 5-gallon quantity of water was placed in a mixing tank equipped with a propeller-type agitator and was agitated while 100 grams of Surfynol 61 (3,5-dimethyl-1-hexyn-3-ol) was added thereto. The mixture was agitated until all of the Surfynol 61 had gone into solution. Thereafter 5 grams of Igepal CA-630(iso-octyl-phenoxy-polyoxyethylene ethanol) diluted with water was added to the mix under mild agitation and the entire composition was admixed for 1 minute. The composition was then applied to glass fibers by means of a roll applicator, as the fibers were being attenuated from bushings and collected into strands. The glass strands were then formed into a mat and filamentized by impinging water in the manner described above; thereafter a resinous binder composition was applied thereto. The glass fiber mat was then cured in an oven at a temperature of about 450° F.; thereafter it was impregnated with asphalt and cut into appropriate sizes and the product was eventually placed on a roof. The glass fiber mat formed of fibers treated with the composition of this invention exhibited essentially the same water-repellent properties as an identical mat not treated with the composition of the invention. At the same time, however, the distribution of the filaments, bonding resins, and asphalt additive within the glass fiber mat was substantially better when the glass fibers had been treated with the composition of the invention and filamentized in accordance with the process described above than in mats formed of glass fibers not so treated, thus demonstrating that better resin and fiber distribution is achieved by using the filamentizing composition of the invention. Because of its substantially fugitive nature, however, it does not affect the water-repellent properties of the glass fiber mat.

Substantially the same results can be obtained by varying the amounts of the surfactants making up the filamentizing composition. Thus, instead of 100 parts 3,5-dimethyl-1-hexyn-3-ol to 5 parts iso-octyl-phenoxy-polyoxyethylene ethanol, use could be made of a water solution of 95 parts 3,5-dimethyl-1-hexyn-3-ol to 10 parts iso-octyl-phenoxy-polyoxyethylene ethanol with substantially no diminution in effectiveness. Smaller proportions of the minor component are preferred, however.

In its broadest aspect, the process of the invention is a process of manufacturing a glass fiber mat which comprises attenuation streams of molten glass into glass fiber filaments, gathering the filaments into strands, treating the surfaces of the filaments with a composition which is effective to wet out the strand, which does not adversely affect the strength, handling and processing characteristics of the glass filaments, which has minimum build up on the forming equipment used to form the glass fiber mat, which effectively disperses the filaments in the strands, and which renders the filament surface free of highly repellent electrical charges, excessive tack, and excessive slipperiness. The strands of treated filaments are gathered into a mat, and the filaments of the strands are separated by application of a fluid. It will be understood that various changes can be made in the details of formulation of the filamentizing composition of this invention, as well as the application thereof, without departing from the scope and spirit of the invention.

What I claim is:

1. The process of manufacturing a glass fiber mat suitable for use as a roof covering which process comprises attenuating glass fibers, treating said glass fibers with a composition consisting essentially of an aqueous solution containing at least about 0.1 percent by weight of 3,5-dimethyl-1-hexyn-3-ol and isoctyl-phenoxy-polyoxyethylene ethanol, about 85 to 98.5 percent by weight of the solute in said solution being 3,5-dimethyl-1-hexyn-3-ol and about 1.5 to 15 percent by weight therefor being isoctyl-phenoxy-polyoxyethylene ethanol, forming said glass fibers into strands, projecting said strands onto a collecting surface in a predetermined fashion, filamentizing said strands, applying a resinous binder composition to said strands, and curing said resinous binder composition by the application of heat.

2. The process of claim 1 wherein the solute in the aqueous solution consists of 98 percent 3,5-dimethyl-1-hexyn-3-ol and 2 percent by weight isooctyl-phenoxy-poly-oxyethylene ethanol.

3. In the process of filamentizing strands of glass fibers, the improvement of pretreating said strands with an aqueous composition consisting essentially of an aqueous solution containing at least about 0.1 percent by weight of 3,5-dimethyl-1-hexyn-3-ol and isooctyl-phenoxy-polyoxyethylene ethanol, about 85 to 98.5 percent by weight of the solute in said solution being 3,5-dimethyl-1-hexyn-3-ol and about 1.5 to 15 percent by weight thereof being isooctyl-phenoxy-polyoxyethylene ethanol, and impinging a fluid on the strands to cause filamentizing thereof.

4. The process of claim 3 in which 3,5-dimethyl-1-hexyn-3-ol constitutes 98 percent by weight of the solute in the aqueous solution and isooctyl-phenoxy-polyoxethylene ethanol constitutes 2 percent by weight thereof.

5. The process of manufacturing a glass fiber mat which comprises attenuating streams of molten glass into glass fiber filaments, gathering the filaments into strands, treating the surfaces of the filaments with a composition consisting essentially of an aqueous solution containing at least about 0.1 percent by weight of 3,5-dimethyl-1-hexyn-3-ol and isooctyl-phenoxy-polyoxyethylene ethanol, about 85 to 98.5 percent by weight of the solute in said solution being 3,5-dimethyl-1-hexyn-3-ol and about 1.5 to 15 percent by weight thereof being isooctyl-phenoxy-polyoxyethylene ethanol in order to decrease the surface tension of fluid to be applied, gathering the strands of treated filaments into a mat, spraying fluid onto the mat, and separating the filaments of the strands by application of the fluid.

6. The process of claim 5 in which the mat is impregnated with a bonding resin after the filaments are separated.

7. The process of claim 6 in which the mat is additionally impregnated with asphalt.

8. The process of claim 5 in which the mat is impregnated with a bonding resin, and thereafter heated to cure the resin and volatilize the filamentizing fluid.

* * * * *